Dec. 18, 1934.  B. L. BOBROFF  1,984,628
SIGNAL SWITCH CONSTRUCTION FOR AUTOMOTIVE VEHICLES
Filed May 12, 1930   2 Sheets-Sheet 1

Inventor
Bornett L. Bobroff
By Arthur R. Woolfork
Attorney

Dec. 18, 1934. B. L. BOBROFF 1,984,628
SIGNAL SWITCH CONSTRUCTION FOR AUTOMOTIVE VEHICLES
Filed May 12, 1930 2 Sheets-Sheet 2

Inventor
Bornett L. Bobroff
By Arthur R. Woolfolk
Attorney

Patented Dec. 18, 1934

1,984,628

UNITED STATES PATENT OFFICE 1,984,628

SIGNAL SWITCH CONSTRUCTION FOR AUTOMOTIVE VEHICLES

Bornett L. Bobroff, Racine, Wis.

Application May 12, 1930, Serial No. 451,561

2 Claims. (Cl. 74—484)

This invention relates to a signal switch construction for automotive vehicles.

Objects of this invention are to provide a horn button signal switch which is so constructed that the same member, or button, serves both as the horn button and signal, or direction switch button, and is so made that it is adapted to be mounted centrally of the steering wheel.

In horn buttons it has been found, from actual practice, that the wire extending through the steering column frequently breaks or has its insulation worn off due to rubbing and vibration, and it will be readily appreciated that any wire or group of wires located in the steering column is subjected to the same dangers.

This invention has for its further objects the provision of a horn button signal switch construction in which all wires are eliminated from the steering column and steering wheel, although the operating member or control member button may be located centrally of the steering wheel and although such button controls not only the horn, but also a plurality of signalling devices.

Further objects are to provide a horn button and signal switch button which is depressible in the usual manner to sound the horn and which is rotatable to the right or left corresponding to the intended direction of turn of the automotive vehicle to operate the corresponding signalling device.

Further objects are to provide a novel form of combined horn button and signal switch button which is so made that the hand of the operator may be pressed thereon and will occasion no discomfort to the operator and which is provided with a radially projecting rib adapted to be grasped by the fingers of the operator to rotate the button, and which is provided with depressed portions on opposite sides of the rib to accommodate the fingers of the operator, the upper surface of the rib merging into the rounded upper surface of the button.

Further objects are to provide a horn and signal switch button or member which does not rotate with the hand wheel or gas or spark levers although mounted centrally of the hand wheel, and which does not disfigure the hand wheel but simulates an attractive form of horn button although possessing numerous functions as outlined above, and which is compact and free from any contacts adjacent the hand wheel or in any portion of the steering column.

Further objects are to provide a horn button and signal switch construction which is easy to assemble and is easy to accurately adjust, in which a combined horn switch and signal switch rod extends through the steering column and may be easily inserted, and in which a combination horn and signal switch proper is carried adjacent the lower end of the steering column and is easily adjusted and connected to the rod.

Further objects are to provide a construction in which the movable and stationary contacts are readily accessible although completely housed, and in which simple and readily accessible terminals are provided for the horn and signal circuits so that no wires need extend into even the housed portion of the switch.

Further objects are to provide a novel construction in which a single rod extending through the steering column is so controlled that it may be given either axial or rotary motion to selectively operate either the horn switch or signal switch, and in which novel means are provided which may be depressed to depress the rod and sound the horn, and which may be rotated or turned in either direction to rotate the rod and accordingly operate the signal switch movable contact.

An embodiment of the invention is shown in the accompanying drawings, in which:—

Figure 3:
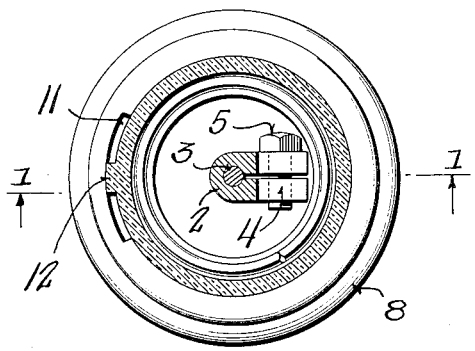
Figure 3 is a sectional view on the line 3—3 of Figure 1.

Referring to the drawings it will be seen that a single button 1 is provided which selectively operates the horn switch and the direction signal switch in a manner hereinafter described. This button may be formed of bakelite or similar material and has molded therein a tubular member or clamp 2, which is provided with a recess for the reception of the rod 3 and is split and provided with ears 4 which may be drawn towards each other by means of the bolt or screw 5, see Figure 3, to clamp the rod 3.

Figure 1:
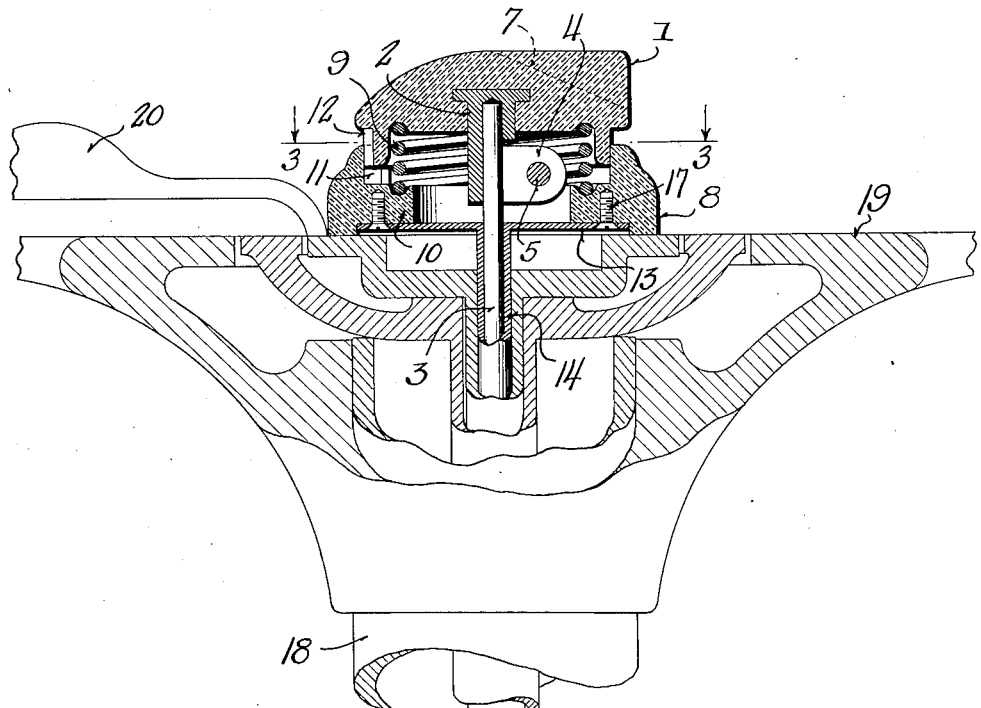
Figure 1 is an elevation, partly broken away and partly in section showing the apparatus in assembled position, such view corresponding to a section on the line 1—1 of Figure 3.
Figure 1:
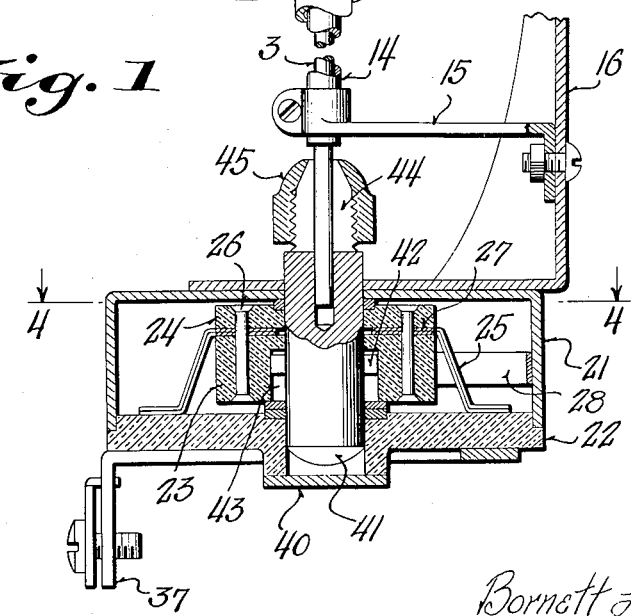
Figure 2:
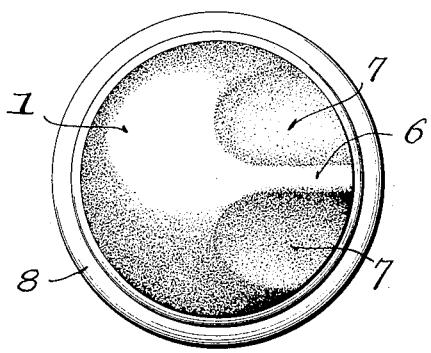
Figure 2 is a plan view of the manually operable button.

The combined horn and signal switch button 1, as may be seen from Figures 1 and 2 has a gradually rounding upper surface and is provided with a radially extending rib 6 which may be grasped by the fingers of the operator to rotate the button and is provided with depressions 7 on opposite sides of the rib to accommodate the fingers of the operator. The rib 6 merges into the upper surface of the button, so that no sharp portions are provided. This allows the operator to place his hand upon the button to depress the button and sound the horn without occasioning him any discomfort as the entire upper surface, although the radial rib is provided, is generally rounding.

A casing or sleeve 8 guides the button and houses a spring 9 positioned between the button 1 and an inner flange 10 of the guiding casing 8. Preferably the casing is notched out, as shown at 11 in Figure 3, to receive a key 12 formed on the button 1 and to provide stops to limit the rotation of the button, although allowing the button to freely slide upwardly or downwardly with reference to the casing 8.

The casing 8 is slightly recessed on its lower side, see Figure 1, and receives a flange 13 rigid with a tube 14. The tube 14 is rigidly held, adjacent its lower end, by means of a clamp 15 secured to a bracket 16 which is attached to any relatively stationary portion of the automotive vehicle such as a side frame bar, not shown. The flange 13 of the tube, is rigidly attached to the casing 8 by means of screws 17.

The combined switch button 1, and casing 8 are mounted adjacent the upper end of the steering column, indicated generally at 18, and centrally of the steering wheel 19. However, neither the button 1 nor casing 8 is rotated due to the rotation of the hand wheel 19 or spark or gas lever 20, due to the fact that the casing is rigidly attached to the rigidly mounted tube 14.

From the description thus far given, it is apparent that the button 1 may be depressed to depress the rod 3 or rotated to the right or left to correspondingly rotate the rod 3.

The lower portion of the apparatus comprises a signal switch proper and a horn switch selectively operated by the single rod 3. It is to be particularly noted, at this point, that no wires extend through the steering column,—in reality, no wires even enter the steering column.

Figure 4:
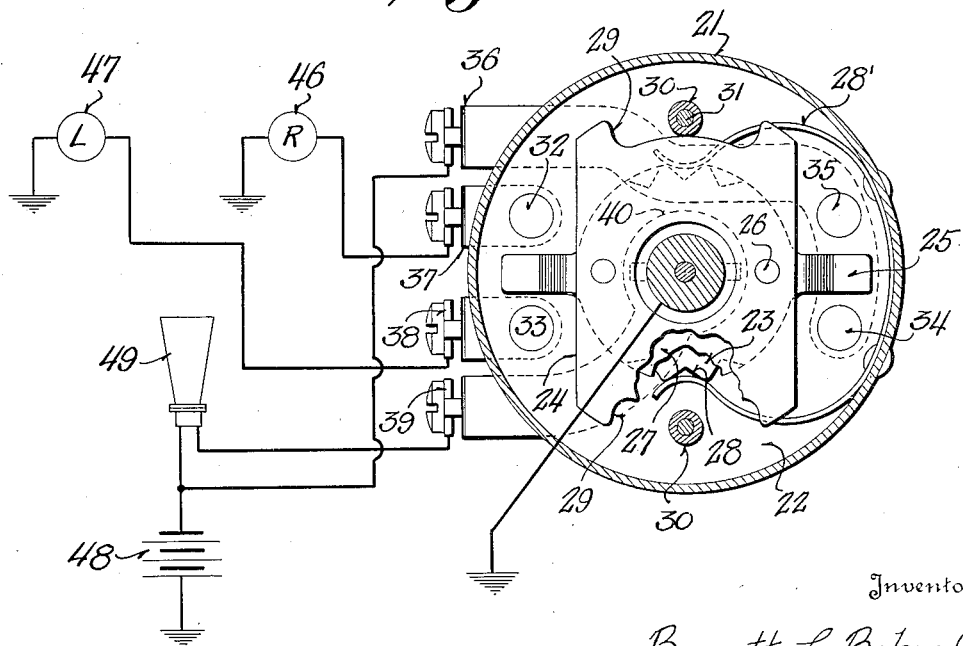
Figure 4 is a sectional view on the line 4—4 of Figure 1, and showing the wiring diagrammatically.

A signal switch housing 21 is secured to the bracket 16 and carries an insulating base 22, see Figures 1 and 4. A rotary signal switch element is mounted within the housing and comprises a rotary insulating hub 23, an upper insulating member 24, and a contact arm 25 held between the members 23 and 24 by rivets 26. Preferably, as may be seen from Figure 4 the contact arm 25 is provided with an annular central portion 27 and the hub 23 is provided with three pairs of diametrically opposed notches 28, within any pair of which the curved arms of a U-shaped spring 28' are adapted to seat. Also, it is preferable to provide ears 29 on the upper member 24 which are adapted to contact with spacers 30 carried by the bolts or rivets 31 which hold the insulating base 22 to the housing 21.

The insulating base 22 carries contacts 32, 33, 34, and 35, and terminals 36, 37, 38, and 39 see Figure 4. The contacts 32 and 33 are respectively connected to the terminals 37 and 38 and both the contacts 34 and 35 are connected to the terminal 36. The terminal 39 is connected to a central contact 40, see Figure 1.

As shown in Figure 1, a slidable switch element 41, in the form of a metallic plunger is slidably mounted centrally of the rotary contact switch element, and is provided with a transversely carried bar 42 which slides in keyways 43 formed in the insulating hub 23. This construction allows the member 41 to slide freely through the hub 23 and yet permits rotary motion to be transmitted to the hub when the member 41 is rotated.

The slidable switch element 41 is provided with a plurality of split, externally threaded jaws 44 which are adjustably clamped to the rod 3 by means of the clamping nut 45.

It will be seen that the construction is such that the lower portion of the apparatus may be readily adjusted to fit any type or length of steering column and may be most easily mounted adjacent the lower portion of such steering column.

In Figure 4 a single direction signal apparatus has been shown diagrammatically and it comprises a right signal lamp or member 46 and a left signal lamp or member 47 connected respectively to the terminals 37, and 38, and adapted to be lighted when the switch arm 25 bridges contacts 32 and 34, or 33 and 35 respectively.

It is to be understood that a signal device is preferably located on each side and at the rear of the vehicle and that each signal device is capable of giving any one of a plurality of direction signals independently of any other signal device, but that all signal devices are simultaneously controlled by the signal switch. In other words, a single signal device has been diagrammatically shown in Figure 4 capable of giving either a right or a left signal, but it is intended that a plurality of such devices be used, such additional devices being similar to that diagrammatically shown in Figure 4, but omitted from the drawings for the sake of clearness.

Referring again to Figure 4 it will be seen that a battery 48 is grounded on one side and connected on the other side to the horn 49 and to the terminal 39. One side of each signal lamp 46 and 47 is grounded. The horn 49 is connected to the terminal 39 and from thence to the central contact 40, so that when the slidable member, or plunger, 41, see Figure 1, is depressed, the horn is sounded.

It will be seen that the combined horn switch or signal switch is selectively operated from the button 1. When the button is depressed, the horn is sounded, and when the button is rotated to the right or left the corresponding direction signal is given.

It is to be particularly noted that no wires extend through or even enter the steering column. In fact no wires enter the switch but are merely connected to the terminals. This prevents abrasion of the insulation of the wires, short circuits, or breaking of the wires.

It is an extremely easy matter to slip the rod 3 and tube 14 through the steering column and secure the lower portion of the apparatus in place.

Although the invention has been described in considerable detail, it is intended that such description be interpreted as illustrative rather than limiting, as the invention may be variously embodied and is to be interpreted as claimed.

I claim:—

1. The combination of an automotive vehicle steering column, a tube extending through said column and rigidly supported adjacent the lower end thereof, a rod extending through and contacting with said tube, a plate rigid with the upper end of said tube, a casing carried by said plate, a button secured to said rod and slidably telescoping with said casing, and a spring for moving said button outwardly with reference to said casing, whereby said rod may be rotated or depressed by said button and whereby said casing is held in place by the rigid securing of said tube.

2. The combination of an automotive vehicle steering column, a tube extending through said column, means detachably rigidly engaging the lower end of said tube, a plate rigid with the upper end of said tube, a casing secured to said plate and extending upwardly therefrom, a rod extending through and contacting with said tube and slidable and rotatable with respect to said tube, a button detachably secured to the upper end of said rod, and spring means interposed between said button and said casing.

BORNETT L. BOBROFF.